(12) United States Patent
Tan et al.

(10) Patent No.: US 9,439,080 B2
(45) Date of Patent: Sep. 6, 2016

(54) FEEDBACK DESIGN OF HIERARCHICAL COORDINATED MULTIPOINT TRANSMISSION

(75) Inventors: Shuang Tan, Beijing (CN); Tommi Koivisto, Espoo (FI); Helka-Liina Maattanen, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 380 days.

(21) Appl. No.: 14/124,273

(22) PCT Filed: Jun. 8, 2011

(86) PCT No.: PCT/CN2011/075442
§ 371 (c)(1),
(2), (4) Date: Dec. 6, 2013

(87) PCT Pub. No.: WO2012/167424
PCT Pub. Date: Dec. 13, 2012

(65) Prior Publication Data
US 2014/0112195 A1  Apr. 24, 2014

(51) Int. Cl.
| H04W 16/18 | (2009.01) |
| H04W 24/10 | (2009.01) |
| H04B 7/02 | (2006.01) |
| H04B 7/06 | (2006.01) |
| H04W 48/20 | (2009.01) |

(52) U.S. Cl.
CPC ............. *H04W 16/18* (2013.01); *H04B 7/024* (2013.01); *H04B 7/0632* (2013.01); *H04B 7/0639* (2013.01); *H04W 24/10* (2013.01); *H04W 48/20* (2013.01)

(58) Field of Classification Search
None
See application file for complete search history.

(56) References Cited

U.S. PATENT DOCUMENTS

| 2011/0013710 A1 | 1/2011 | Xiao | |
| 2012/0088514 A1* | 4/2012 | Lee | H04B 7/0434 455/450 |
| 2013/0017825 A1* | 1/2013 | Li | H04L 1/0029 455/425 |

FOREIGN PATENT DOCUMENTS

| CN | 101854658 | 10/2010 |
| WO | 2010134792 | 11/2010 |
| WO | WO2010140860 | * 12/2010 |

OTHER PUBLICATIONS

R1-110743; 3GPP; TSG; RAN ;WG1; Meeting #64; Feb. 21-25, 2011;Taipei,Taiwan;Samsung (4 pages).

(Continued)

*Primary Examiner* — Ayaz Sheikh
*Assistant Examiner* — Sori Aga
(74) *Attorney, Agent, or Firm* — Oblon, McClelland, Maier & Neustadt, L.L.P.

(57) ABSTRACT

The present invention provides a method, apparatus and a computer program product for feedback design of hierarchical coordinated multipoint transmission. The present invention includes obtaining, at a user equipment, a list including a predetermined number of cells, identifying, at the user equipment, a cooperation set of cells including the cell serving the user equipment, determining, at the user equipment, for each cell included in the list whether the cell belongs to the identified cooperation set of the user equipment, and if the cell belongs to the cooperation set of the user equipment, reporting a first predetermined set of parameters, and if the cell does not belong to the cooperation set of the user equipment, reporting a second predetermined set of parameters.

20 Claims, 3 Drawing Sheets

(56) References Cited

OTHER PUBLICATIONS

R1-110742;3GPP;TSG;RAN;WG1;Meeting #64;Feb. 21-25, 2011;Taipei, Taiwan;Samsung (7 pages).

R1-110801;3GPP;TSG;RAN;WG1;Meeting #64;Feb. 21-25, 2011;Taipei, Taiwan;Alcate-Lucent Shanghai Bell, Alcated-Lucent (3 pages).

R1-110865;3GPP;TSG;RAN;WG1; Meeting #64; Feb. 21-25, 2011;Taipei, Taiwan;NTT DOCOMO (6 pages).

\* cited by examiner

FEEDBACK DESIGN OF HIERARCHICAL COORDINATED MULTIPOINT TRANSMISSION

TECHNICAL FIELD

The present application relates generally to an apparatus and method and a computer program product for feedback design of hierarchical coordinated multipoint transmission.

BACKGROUND

The following meanings for the abbreviations used in this specification apply:
3GPP The 3$^{rd}$ Generation Partnership Project
BS Base Station
CB Coordinated Beamforming
CoMP Coordinated Multipoint Transmission/Reception
CQI Channel Quality Indicator
CS Coordinated Scheduling
CSI Channel State Information
JP Joint Processing
LTE Long Term Evolution
LTE-A Long Term Evolution Advanced
MIMO Multiple-Input Multiple-Output
MU Multi-User
PMI Precoding Matrix Indicator
SU Single-User
UE User Equipment In Long Term Evolution (LTE) and LTE-Advanced (LTE-A), as proposed by the 3$^{rd}$ Generation Partnership. Project (3GPP), single cell single-user (SU-) and multi-user (MU-) multiple-input multiple-output (MIMO) network performance is interference-limited, especially at the cell edge.

Therefore, introduction of the technology of coordinated multipoint (CoMP) transmission/reception has been considered, where in downlink, multiple base stations (BSs) cooperate in scheduling and transmission in order to strengthen a desired signal and mitigate inter-cell interference. So far, two schemes of CoMP, named Joint Processing (JP) CoMP and Coordinated Beamforming/Coordinated Scheduling (CB/CS) CoMP, are mainly investigated in 3GPP. Both schemes aim at enhancing the system performance by coordination among the cells.

In particular, in JP CoMP, two or more BSs transmit simultaneously to a CoMP user, and in CB/CS CoMP the scheduling decisions of neighbor cells are coordinated in order to reduce interference. The CoMP feature is likely to be included in 3GPP LTE specifications from Release 11 onwards.

The initial problem that CoMP is intended to improve is the performance of cell edge users, because especially at cell edges, the performance is interference limited. In ideal CoMP, all cells in the network would cooperate or one control unit would make all centralized scheduling decisions. In practice, cooperation at this level is impossible due to increase in feedback and scheduling/cooperation complexity.

The cooperation has been limited to N cells, defining the cooperation set. Within the cooperation set, JP or CB/CS CoMP is performed. So far, JP CoMP and CB/CS CoMP have been considered to be separate schemes in 3GPP with different feedback, backhaul and coordination demands and also with different benefits.

In this regard, CB/CS CoMP has been considered to be a lighter way of CoMP as only PMI feedback is needed and scheduler only avoids transmitting to directions that potentially cause interference.

On the other hand, JP CoMP does cooperative transmission and has been considered to be the CoMP scheme that gives better gains but requires more feedback and backhaul.

Further information on JP CoMP can be found, for example, in document [1] and further information on CB/CS CoMP can be found, for example, in document [2].

In order to maximize the benefits of CoMP downlink transmission, the cooperating BS set should include those BSs having the strongest channel strength from one User Equipment (UE). However, in practice, the cooperation set of each UE could be very different and overlapping to each other. Those 'arbitrarily' overlapping cooperation sets make the scheduling at network side extremely complicated and even inaccessible.

Therefore, some compromise has to be made, such as employing static/semi-static cooperation set layout for all UEs. Apparently, these uniform cooperation sets could not satisfy all UEs' optimal CoMP requirements, and some set-edge UEs cannot be served by his/her own optimal cooperation set. The same "cell edge problem" remains at the set borders independent of whether JP or CB/CS CoMP is performed within the sets.

In the context of homogeneous networks, 3GPP assumes a network deployment where N (e.g., 9) cells are thought of belonging to a cell cluster that is controlled by one centralized control unit. These N cells are divided into several cell cooperation sets with smaller size, e.g. 1-3 cells each. The different ways of dividing the N cells into smaller coordination sets is named CoMP layouts in the following.

The CoMP layout selection has been considered to be either network centric or UE centric. In network centric layout selection, the control unit determines one fixed layout or adapts among different options. In either way, there will be set-edge users that are not served by CoMP.

As mentioned above and also discussed in document [3], the ideal UE centric approach is impractical and signaling overhead and scheduling complexity limit the gains.

A further proposed scheme is described in document [4]. According to this document, the UE could select from two predefined cluster patterns the more suitable one.

In this scheme, two fixed patterns are available and either CB/CS CoMP or JP CoMP is performed

PRIOR ART DOCUMENTS

[1] "Preliminary CoMP JP results for Homogenous Networks", R1-110743, 3GPP TSG RAN WG1 Meeting #64, Taipei, Taiwan, Feb. 21-25, 2011.
[2] "Preliminary performance evaluation of CS/CB in homogeneous networks" R1-110742, 3GPP TSG RAN WG1 Meeting #64, Taipei, Taiwan, Feb. 21-25, 2011.
[3] "Cell clustering for scenario 2" R1-110801, 3GPP TSG RAN WG1 Meeting #64, Taipei, Taiwan, Feb. 21-25, 2011.
[4] "System performance for JP-CoMP in Homogeneous Networks with high Tx power RRHs", R1-110865, 3GPP TSG RAN WG1 Meeting #64, Taipei, Taiwan, Feb. 21-25, 2011.

SUMMARY OF THE INVENTION

It is an object of the present invention to provide an apparatus and method and a computer program product for feedback design of hierarchical coordinated multipoint transmission.

According to an aspect of the present invention, there is provided a method, comprising:

obtaining, at a user equipment, a list including a predetermined number of cells;

identifying, at the user equipment, a cooperation set of cells including the cell serving the user equipment;

determining, at the user equipment, for each cell included in the list whether the cell belongs to the identified cooperation set of the user equipment; and if the cell belongs to the cooperation set of the user equipment, reporting a first predetermined set of parameters, and if the cell does not belong to the cooperation set of the user equipment, reporting a second predetermined set of parameters.

According to further refinements of the invention as defined under the above aspects if the cell belongs to the cooperation set of the user equipment but is not included in the list, no parameters are reported;

the first set of parameters includes Channel Quality Indicator, CQI, per-cell Precoding Matrix indicator, PMI, and inter-cell combiners according to Joint Processing Cooperation Multipoint Transmission, JP CoMP;

the second set of parameters includes best companion Precoding Matrix Indicator, PMI, according to inter-set Coordinated Beamforming/Coordinated Scheduling, CB/CS, CoMP;

the second set of parameters includes worst companion Precoding Matrix Indicator, PMI, according to inter-set Coordinated Beamforming/Coordinated Scheduling, CB/CS, CoMP, obtaining the list may comprise composing the list at the user equipment;

the method further comprises measuring, at the user equipment, a received power from a base station of a specific cell, and composing, at the user equipment, the list including the predetermined number of cells based on the received power of the cells;

obtaining the list may comprise receiving the list at the user equipment;

the method further comprises measuring, at the user equipment, a received power from a base station of a specific cell, reporting the measured received power of the cells to a specific base station, and receiving, from the specific base station, the list including the predetermined number of cells based on the measured received power of the cells;

the predetermined number is a threshold controlled number.

According to another aspect of the present invention there is provided an apparatus, comprising:

a obtaining unit configured to obtain a list including a predetermined number of cells;

an identifying unit configured to identify a cooperation set of cells including the cell serving the user equipment;

a determining unit configured to determine, for each cell included in the list, whether the cell belongs to the identified cooperation set of the user equipment; and a reporting unit configured to report, if the cell belongs to the cooperation set of the user equipment, a first predetermined set of parameters, and to report, if the cell does not belong to the cooperation set of the user equipment, a second predetermined set of parameters.

According to further refinements of the invention as defined under the above aspects if the cell belongs to the cooperation set of the user equipment but is not included in the list, the reporting unit is further configured to report no parameters;

the first set of parameters includes Channel Quality Indicator, CQI, per-cell Precoding Matrix indicator, PMI, and inter-cell combiners according to Joint Processing Cooperation Multipoint Transmission, JP CoMP;

the second set of parameters includes best companion Precoding Matrix Indicator, PMI, according to inter-set Coordinated Beamforming/Coordinated Scheduling, CB/CS, CoMP;

the second set of parameters includes worst companion Precoding Matrix Indicator, PMI, according to inter-set Coordinated Beamforming/Coordinated Scheduling, CB/CS, CoMP;

the obtaining unit further comprises a composing unit configured to compose the list including the predetermined number of cells;

the apparatus further comprises a measuring unit configured to measure a received power from a base station of a specific cell, wherein the composing unit is configured to compose the list including the predetermined number of cells based on the received power of the cells;

the obtaining unit further comprises a receiving unit configured to receive the list including the predetermined number of cells;

the apparatus further comprises a measuring unit configured to measure a received power from a base station of a specific cell, a reporting unit configured to report the measured received power of the cells to a specific base station, wherein the receiving unit is configured to receive, from the specific base station, the list including the predetermined number of cells based on the measured received power of the cells the predetermined number is a threshold controlled number.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

With respect to the above and the following description of embodiments of the invention, it is noted that the terms "means" and "units" as used in the description and Figures have the same meaning and are thus interchangeable.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of example embodiments which is to be taken in conjunction with the appended drawings, in which.

DETAILED DESCRIPTION

In the following, embodiments of the present invention are described by referring to general and specific examples of the embodiments. It is to be understood, however, that the description is given by way of example only, and that the described embodiments are by no means to be understood as limiting the present invention thereto.

This present invention deals with channel state information (CSI) feedback from the UE to the eNB in support of above-mentioned CoMP techniques.

To solve the aforementioned problem, this present invention proposes a solution that has limited complexity, and allows CoMP for each UE exactly from those cells that are the most potential interferers with feedback that does not contain redundant CSI.

According to an embodiment of the present invention, it is assumed that a layout is selected, which is in average the best layout for all users, and concerns the feedback and transmission assuming a pre-selected layout. The layout selection need not be fixed but can be slowly time-variant (semi-static).

According to an embodiment of the present invention, JP CoMP is done within the coordinating set and CB/CS CoMP is done between the coordinating sets with feasible Channel Quality Indicator (CQI) and Precoding Matrix Indicator (PMI) feedback supporting. Depending on channel strength between a UE and the BSs within and outside the coordinating set, JP CoMP and/or CB/CS CoMP can be performed for the UE. The feedback is designed such that UE sends more accurate and finer channel information, e.g. CQIs, PMIs and inter-cell combiners, needed for more advanced JP CoMP transmission to those cells 'within the cooperation set', and some extra coarse information, e.g. best/worst companion PMIs, to those cells that would be potential interferers 'outside the desired cooperation set' for simpler CB/CS CoMP transmission.

As a generalization, also the feedback accuracy and reporting granularity in both frequency-domain and time-domain can be different for intra-set and inter-set CoMP transmissions. The inner-set CQI/PMI/combiner feedback enables not only more advanced CoMP scheme (e.g., JP CoMP) but also simpler CoMP scheme (e.g., CB/CS CoMP) within the cooperation set, and the outer-set PMI feedback enables only simpler CoMP scheme (e.g., CB/CS CoMP) between coordination sets due to the hierarchical nature of the feedback.

As a result the UEs at the center of the set are served by JP CoMP with aid of more accurate channel information and the UEs at the edge of the set are served by CB/CS CoMP with coarser channel information, and the according feedback is sent for a BS only if that BS is a potential interferer for the UE.

Hence according to the selected cooperation set layout and path losses from the eNBs to the UE, for each cell a feedback type needs to be determined. At least three ways of conveying this information to the UE are envisioned:

- Signaling to the UE a feedback type applied for a specific cell (e.g. a one-bit indicator per cell).
- Signaling to the UE the cooperation set in addition to the reporting set. UE reports more accurate CSI for the cooperation set and coarse CSI for the cells outside the cooperation set but within the reporting set.
- Signaling to the UE the cooperation set and a quantized reporting threshold, and UE is able to further determine the feedback type needed for each BS.

In the following, a possible implementation of the present invention will be explained with reference to FIG. 1.

Figure 1:
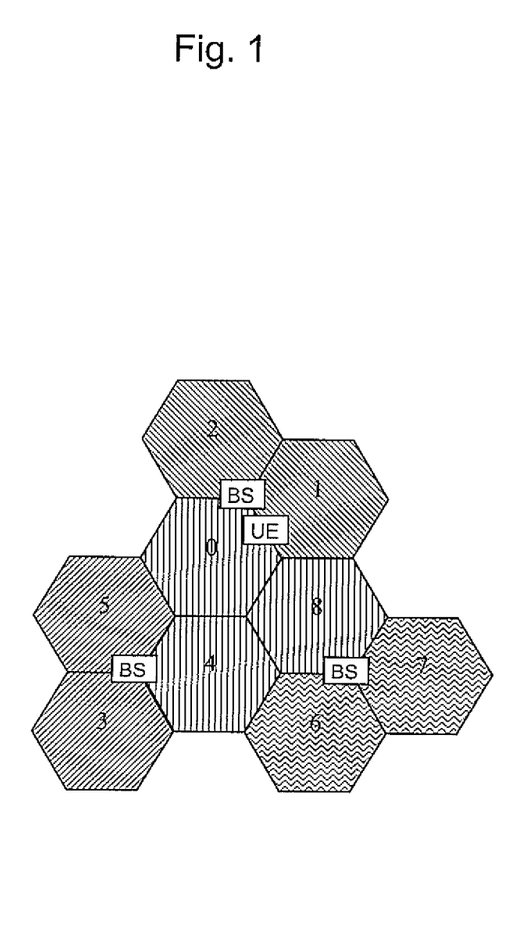
FIG. 1 shows a CoMP Cluster consisting of 9 cells divided in 4 cooperation sets according to an embodiment of the present invention.

FIG. 1 shows a CoMP Cluster consisting of 9 cells divided in 4 cooperation sets according to an embodiment of the present invention.

According to an embodiment of the present invention, there is assumed a case of a 9-cell CoMP cluster as shown in FIG. 1, which was agreed in CoMP simulation assumptions for homogeneous network deployment in 3GPP. This CoMP cluster is divided into four cooperation sets indicated by different cell filling shadings. The following discussions in this report are all based on this CoMP layout assuming it has already been selected by network.

It has been defined in standards 36.133 (Requirements for support of radio resource management) and 36.331 (Radio Resource Control (RRC) protocol), that a UE has to maintain a list of cells for which the received power (RSRP) is measured. The layout can be selected based on these lists or parts of these lists once the UE has reported the RSRP to the eNB.

Now, according to an embodiment of the present invention, there is assumed a case in which a UE is located at cell edges among cells 0, 1 and 8, in which cell 0 is his/her serving cell. According to large scale channel information, such as path loss and shadow fading, this UE can maintain a list of links to the base stations within the 9-cell cluster, e.g. {0,1,8}, which keeps the best several cells for CoMP transmission. This list is controlled by a parameter alpha, which defines the maximum power difference between the path gain to the serving cell and that of the last element in the list.

Such a concept of alpha is already known in the art. The larger alpha is, means the longer the list could be, more cells are involved in CoMP transmission for this UE, and larger potential CoMP gain could be achieved. The alpha controlled lists of different UEs could certainly be of different sizes. And the links in one UE's list may belong to different cooperation sets, such as in the example list, where links to cells 0 and 8 belong to a specific set, but a link to cell 1 belongs to a different set.

As discussed above, the network selects a CoMP layout based on all UEs' reported RSRPs in order to achieve the best overall performance. Then all UEs will be coordinately transmitted under the same layout, for example the one in the figure above. Since the desired UE's serving cell is in the cooperation set consisting of cells 0, 4 and 8, this UE is naturally served by his/her serving cell 0 cooperating with cells 4 and 8.

Accordingly, this UE needs to report channel information for cells 0, 4 and 8 to base stations. However, the reported cell 4 is not in the UE's link list, and cell 1, on the other hand, is in the list but not reported. It means the UE have to feedback channel information of a weak link (i.e. cell 4), and at the same time suffers strong interference from a cell outside the cooperation set (i.e. cell 1). This is not a good consequence from the perspective of CoMP.

The solution proposed in this invention is designed to avoid this problem and further exploit CoMP benefits.

According to an embodiment of the present invention, the UE feedbacks different extent of channel information for different cells in his/her link list, according to whether the cell is inside or outside the UE's cooperation set. Hence, the following examples are conceivable:

- For those cells that are in the UE's list and belong to the cooperation set as well (i.e. cells 0 and 8 in the example), UE reports CQIs, per-cell PMIs and inter-cell combiners in order to take advantages of JP CoMP. In this scenario, the reported information could have higher accuracy or finer granularity to fully exploit the benefits of more advanced CoMP scheme.
- For those cells that are in the UE's list but do not belong to the cooperation set (i.e. cell 1 in the example), UE feedbacks best companion or worst companion PMIs only for inter-set CB/CS CoMP transmission. In this scenario, the reported information could have lower accuracy or poorer granularity to decrease feedback overhead, as the inter-set CoMP scheme is likely simpler and capable of achieving limited gain.
- For those cells that are not in the UE's list but belong to the cooperation set (i.e. cell 4 in the example), UE does not report anything since those cells unlikely could contribute much for coherent CoMP transmission and cause much interference as well. The BSs could assume zero reporting for those links in scheduling.

This hybrid feedback scheme is able to not only fully exploit one UE's strongest links to BSs, but also to avoid redundant feedback overhead, e.g. CQIs and combiners for the cells outside the cooperation set.

Besides the example scenario, a UE may have all cells in his/her own list belonging to the cooperation set. Then the UE feedbacks CQIs, per-cell PMIs and inter-cell combiners of all links, just like in conventional JP CoMP transmission.

JP CoMP transmission can be done within the cooperation set as in prior art, or in any way found appropriate, for instance CB/CS CoMP. CB/CS CoMP transmission can be done between cooperation sets as in prior art, or in any way found appropriate.

Figure 2:
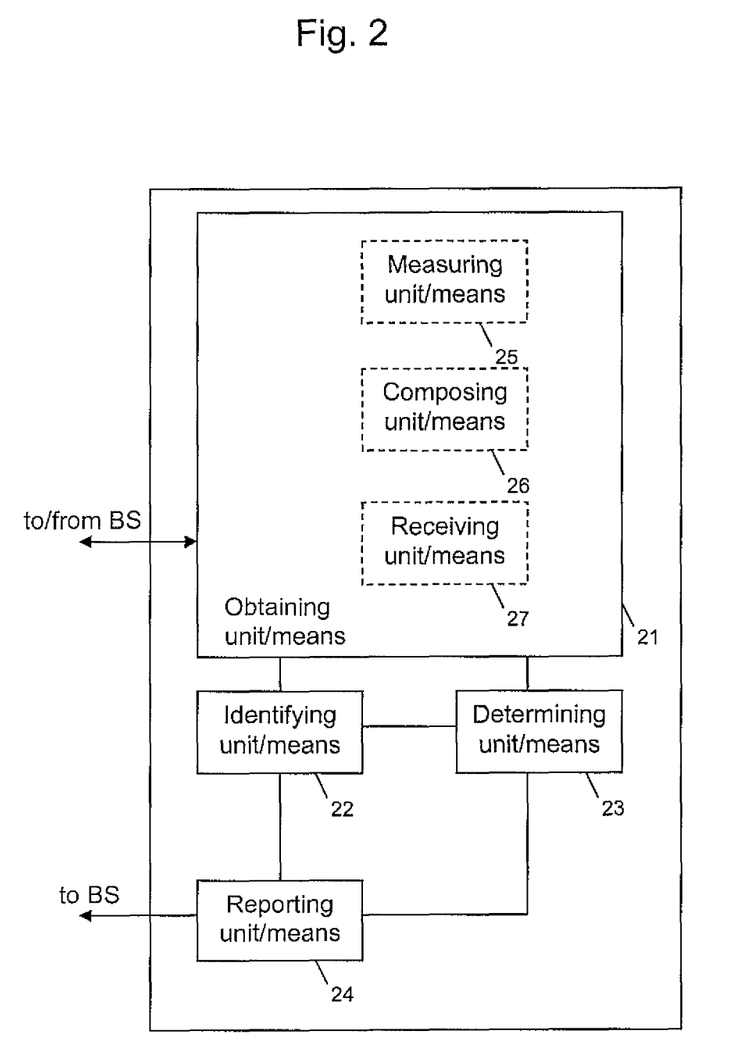
FIG. 2 shows a principle configuration of an example for an apparatus according to certain embodiments of the present invention

FIG. 2 shows a principle configuration of an example for an apparatus according to certain embodiments of the present invention. One option for implementing this example for an apparatus according to certain embodiments of the present invention would be a component in a handset such as a user equipment according to LTE.

Specifically, as shown in FIG. 2, the example for an apparatus comprises a obtaining unit 21 configured to obtain a list including a predetermined number or threshold controlled number of cells, an identifying unit 22 configured to identify a cooperation set of cells including the cell serving the user equipment, a determining unit 23 configured to determine, for each cell included in the list, whether the cell belongs to the identified cooperation set of the user equipment, and a reporting unit 24 configured to report, if the cell belongs to the cooperation set of the user equipment, a first predetermined set of parameters, and to report, if the cell does not belong to the cooperation set of the user equipment, a second predetermined set of parameters. The predetermined number may be a number that is controlled based on a threshold.

Additionally, the user equipment may comprise a measuring unit 25 configured to measure a received power from a base station of a specific cell, and a composing unit 26 configured to compose the list including the predetermined number or threshold controlled number of cells based on the received power of the cells.

Further, the user equipment may comprise a receiving unit 27 configured to receive the list including the predetermined number of cells. The measuring unit 25 may be configured to measure a received power from a base station of a specific cell, the reporting unit 24 may further be configured to report the measured received power of the cells to a specific base station, and the receiving unit 27 may be configured to receive, from the specific base station, the list including the predetermined number of cells based on the measured received power of the cells.

In the foregoing exemplary description of the user equipment, only the units that are relevant for understanding the principles of the invention have been described using functional blocks. The user equipment may comprise further units that are necessary for its respective operation. However, a description of these units is omitted in this specification. The arrangement of the functional blocks of the devices is not construed to limit the invention, and the functions may be performed by one block or further split into sub-blocks.

Figure 3:
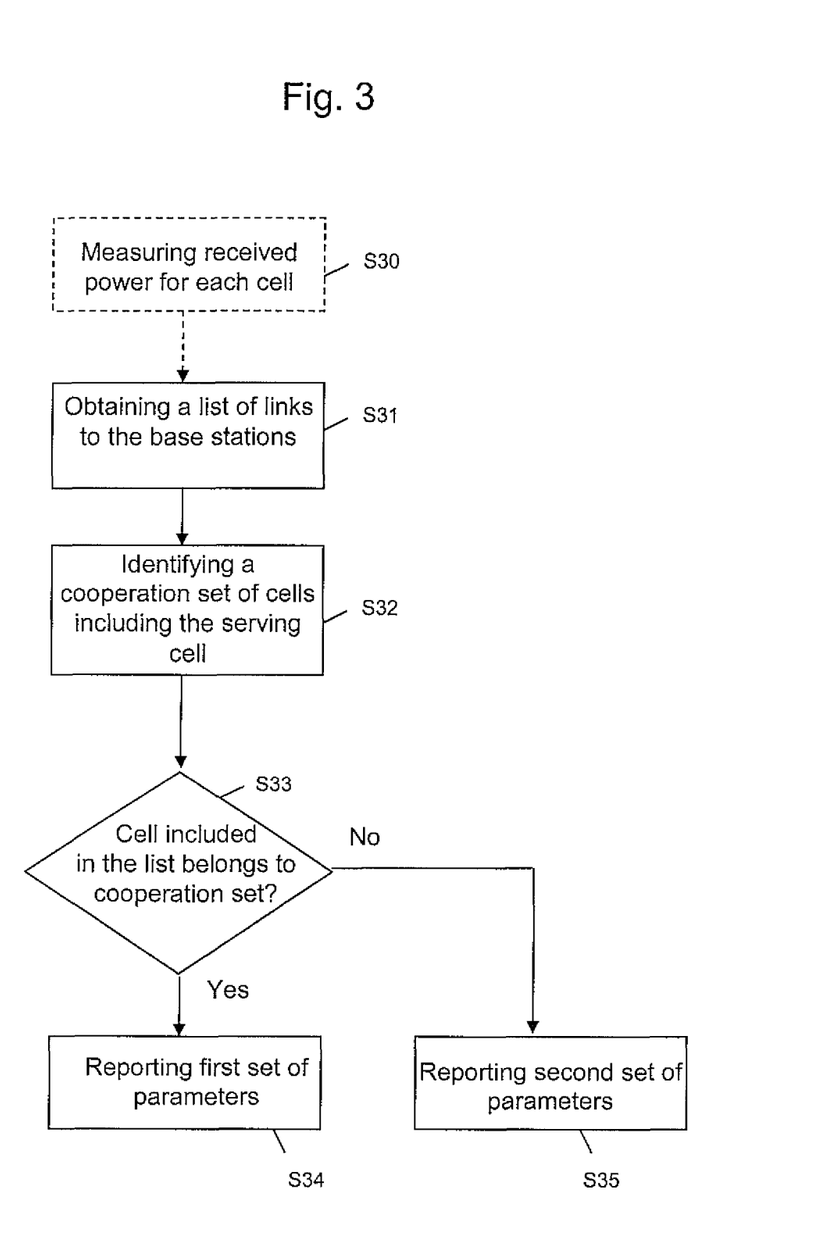
FIG. 3 shows a principle flowchart of an example for a method according to certain embodiments of the present invention.

FIG. 3 shows a principle flowchart of an example for a method according to certain embodiments of the present invention. That is, as shown in FIG. 3, this method comprises obtaining, in step S31, at a user equipment, a list including a predetermined number or threshold controlled number of cells, identifying, in step S32, at the user equipment, a cooperation set of cells including the cell serving the user equipment, determining, in step S33, at the user equipment, for each cell included in the list whether the cell belongs to the identified cooperation set of the user equipment, and if the cell belongs to the cooperation set of the user equipment, reporting, in step S34, a first predetermined set of parameters, and if the cell does not belong to the cooperation set of the user equipment, reporting, in step S35, a second predetermined set of parameters.

Additionally, the method may include measuring, in step S30, at the user equipment, a received power from a base station of a specific cell, and the list including the predetermined number or threshold controlled number of cells may be composed at the user equipment based on the received power of the cells.

Further, the method may comprise receiving the list at the user equipment (not shown in FIG. 3).

In particular, the method may comprise measuring, in step S30, at the user equipment, a received power from a base station of a specific cell, reporting the measured received power of the cells to a specific base station (not shown in FIG. 3), and receiving, from the specific base station, the list including the predetermined number of cells based on the measured received power of the cells (not shown in FIG. 3).

One option for performing the example of a method according to certain embodiments of the present invention would be to use the apparatus as described above or a modification thereof which becomes apparent from the embodiments as described above.

According to the present invention, it is possible to improve the performance of the users at the edge of the cooperation set, and overall upgrade the CoMP gain. Furthermore, the reported channel information fits the strongest links very well without blank reporting of strong links or redundant reporting of weak links.

For the purpose of the present invention as described herein above, it should be noted that

- method steps likely to be implemented as software code portions and being run using a processor at a user equipment (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and user equipments, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as welt as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

We claim:

1. A method, comprising:
obtaining, at a user equipment, a list including a predetermined number of cells;
identifying, at the user equipment, a cooperation set of cells including a cell serving the user equipment;
determining, at the user equipment whether each cell included in the list belongs to the identified cooperation set of the user equipment; and
for cells belonging to the cooperation set of the user equipment, reporting a first predetermined set of parameters, and
for cells not belonging to the cooperation set of the user equipment, reporting a second predetermined set of parameters,
wherein the second predetermined set of parameters are coarser than the first set of predetermined parameters.

2. The method according to claim 1, wherein for cells that belong to the cooperation set of the user equipment but are not included in the list, no parameters are reported.

3. The method according to claim 1, wherein the first set of parameters includes Channel Quality Indicator, CQI, per-cell Precoding Matrix indicator, PMI, and inter-cell combiners according to Joint Processing Cooperation Multipoint Transmission, JP CoMP.

4. The method according to claim 1, wherein the second set of parameters includes best companion Precoding Matrix Indicator, PMI, according to inter-set Coordinated Beamforming/Coordinated Scheduling, CB/CS, CoMP.

5. The method according to claim 1, wherein the second set of parameters includes worst companion Precoding Matrix Indicator, PMI, according to inter-set Coordinated Beamforming/Coordinated Scheduling, CB/CS, CoMP.

6. The method according to claim 1, wherein obtaining the list comprises composing the list at the user equipment, the method further comprising:
measuring, at the user equipment, a received power from a base station of a specific cell, and
composing, at the user equipment, the list including the predetermined number of cells based on the received power of the cells.

7. The method according to claim 1, wherein obtaining the list comprises receiving the list at the user equipment.

8. The method according to claim 7, wherein further comprising:
measuring, at the user equipment, a received power from a base station of a specific cell,
reporting the measured received power of the specific cell, and
receiving, from the base station, the list including the predetermined number of cells based on the measured received power of the specific cell.

9. The method according to claim 1, wherein the predetermined number is a threshold controlled number.

10. An apparatus, comprising:
circuitry configured to obtain a list including a predetermined number of cells;
identify a cooperation set of cells including a cell serving the user equipment;
determine whether each cell included in the list belongs to the identified cooperation set of the user equipment; and
report, for cells belonging to the cooperation set of the user equipment, a first predetermined set of parameters, and report, for cells not belonging to the cooperation set of the user equipment, a second predetermined set of parameters,
wherein the second predetermined set of parameters are coarser than the first set of predetermined parameters.

11. The apparatus according to claim 10, wherein for cells that belong to the cooperation set of the user equipment but are not included in the list, the circuitry is further configured to report no parameters.

12. The apparatus according to claim 10, wherein the first set of parameters includes Channel Quality Indicator, CQI, per-cell Precoding Matrix indicator, PMI, and inter-cell combiners according to Joint Processing Cooperation Multipoint Transmission, JP CoMP.

13. The apparatus according to claim 10, wherein the second set of parameters includes best companion Precoding Matrix Indicator, PMI, according to inter-set Coordinated Beamforming/Coordinated Scheduling, CB/CS, CoMP.

14. The apparatus according to claim 10, wherein the second set of parameters includes worst companion Precoding Matrix Indicator, PMI, according to inter-set Coordinated Beamforming/Coordinated Scheduling, CB/CS, CoMP.

15. The apparatus according to claim 10, wherein the circuitry is further configured to compose the list including the predetermined number of cells.

16. The apparatus according to claim 15, wherein the circuitry is further configured to measure a received power from a base station of a specific cell, and compose the list including the predetermined number of cells based on the received power of the specific cell.

17. The apparatus according to claim 10, wherein the circuitry is further configured to receive the list including the predetermined number of cells.

18. The apparatus according to claim 17, wherein the circuitry is further configured to:
measure a received power from a base station of a specific cell, and
report the measured received power of the specific cell,
wherein the circuitry is further configured to receive, from the base station, the list including the predetermined number of cells based on the measured received power of the specific cell.

19. The apparatus according to claim 10, wherein the predetermined number is a threshold controlled number.

20. A non-transitory computer-readable medium encoded with computer-readable instructions, that when executed by circuitry, causes the circuitry to perform a method comprising:
obtaining, at the user equipment, a list including a predetermined number of cells;
identifying, at the user equipment, a cooperation set of cells including a cell serving the user equipment;
determining, at the user equipment whether each cell included in the list belongs to the identified cooperation set of the user equipment; and
for cells belonging to the cooperation set of the user equipment, reporting a first predetermined set of parameters, and
for cells not belonging to the cooperation set of the user equipment, reporting a second predetermined set of parameters,
wherein the second predetermined set of parameters are coarser than the first set of predetermined parameters.

* * * * *